Sept. 10, 1940.    J. WEEDY    2,214,686
DRILLING JIG
Filed Dec. 6, 1939
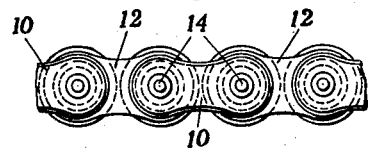
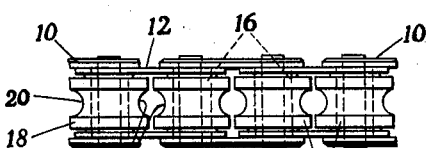
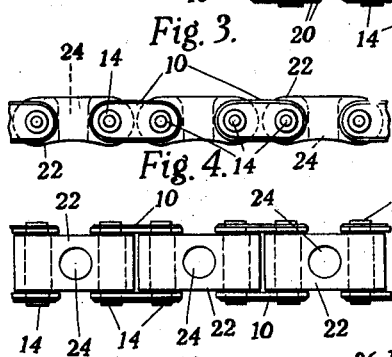
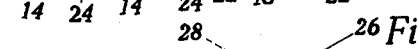
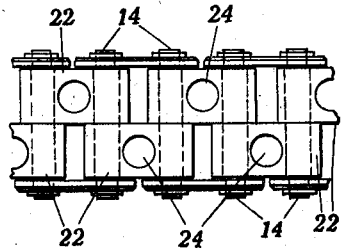
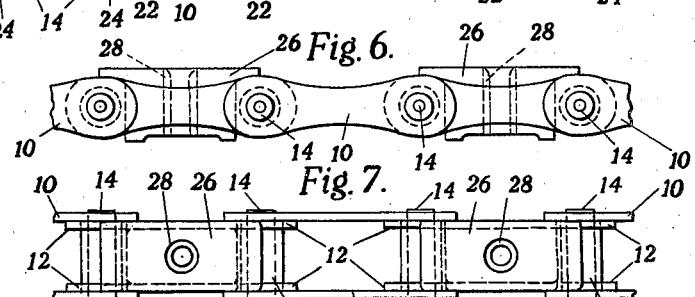
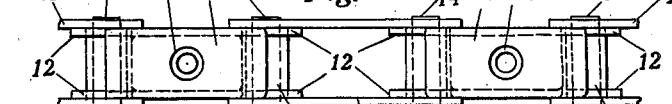
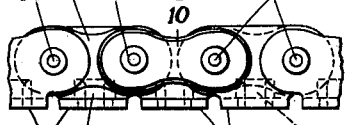
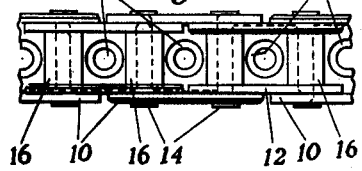
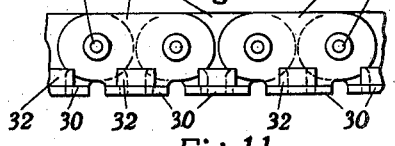
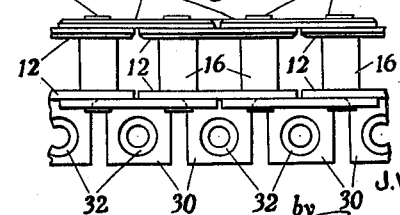
Inventor
J. WEEDY
by Blair & Kilcoyne
Attorney Patented Sept. 10, 1940

2,214,686

UNITED STATES PATENT OFFICE 2,214,686

DRILLING JIG

James Weedy, East Molesey, England, assignor to The Renold and Coventry Chain Company Limited, Didsbury, Manchester, England, a British company Application December 6, 1939, Serial No. 307,934
In Great Britain January 27, 1939

5 Claims. (Cl. 77—62)

In various industries it is often necessary to drill a number of holes at precisely spaced intervals in objects having curved surfaces. One example is the drilling of holes in profiled aircraft members such as wing ribs. Hitherto it has been necessary to provide a separate drilling jig for each contour with the result that in some cases a very large number of separate jigs is required.

The present invention aims at providing a jig which will serve for a large number of different contours thereby very considerably reducing the number of jigs required in circumstances such as are indicated above.

According to the present invention a drilling or like jig comprises a number of bushings connected together end to end by pivoted joints in the manner of a transmission chain. It is evident that a jig made in this way can be stretched over a convex curved surface of any contour with each of the bushes in close contact with the surface to be drilled.

Preferably, standard transmission chain parts are used in the construction of the jig. In a preferred form of the invention the jig resembles an ordinary transmission chain with the usual cylindrical rollers replaced by grooved rollers, the profile of the grooves being circular arcs and the diameters of the rollers being such that the arcs of any two successive rollers are concentric. Thus, each of the gaps between the rollers is circular in profile and forms a guide for a drill of the corresponding diameter, each bushing being constituted by the adjacent parts of two successive rollers. The advantage of this form of jig is that as the rollers are free to rotate the wear of the surfaces of the grooves is distributed over a large area with the result that the jig has a much longer life than those in which the drill is guided by ordinary bushing.

Referring to the accompanying drawing,

Figures 1 and 2 illustrate a preferred embodiment of the invention, Figure 1 being a side elevation of a part of the chain and Figure 2 being a plan. The jig is constructed like a transmission chain, with outer sideplates 10, inner sideplates 12, studs 14, bushings 16 and rollers 18. The rollers are of such a diameter that they nearly meet and they are grooved as shown clearly in Figure 2 so that the profile of the grooves 20 in any two adjacent rollers is circular, the diameter of the circle being the same as that of the holes to be drilled. The rollers are hardened to minimize wear. The pitch of the rollers is made equal to the pitch of the row of holes to be drilled. Such a jig can be stretched over any convex curved surface, being secured at its ends by any suitable means such as clamps.

Figures 3 and 4 are views similar to Figures 1 and 2 of another form of the invention. In this construction the inner links 12, 16 are replaced by hardened blocks 22 formed with holes 24 for guiding the drill.

Figure 5 represents a further development of this form of the invention in which there are two rows of blocks 22 which are staggered, the sideplates 10 being also staggered. Such a jig enables two rows of holes to be drilled at the same time, or a single row of holes at half the pitch of the chain shown in Figure 4, this being effected by moving the jig laterally after drilling one row of holes. It is evident that the jig of Figures 1 and 2 could be made double or multiple width with two or more sets of rollers to enable two or more rows of holes to be drilled at the same time, but in this case the holes would not be staggered.

Figures 6 and 7 are views similar to Figures 1 and 2 of a jig consisting of a chain having inner links 12, 16 and outer links 10, 14 with blocks 26 provided with hardened bushing 28 inserted into the inner links. Here again the chain might be made double or multiple width to provide more than one row of bushing. This construction has the advantage that an existing chain of the correct pitch can be used and blocks with bushes of different diameters can be used with it interchangeably.

Figures 8 and 9 illustrate a jig in which one of the sideplates 12 of each inner link, and also one of the sideplates 10 of each outer link, is formed with an extension 30 which is bent at right angles to form a platform in which a hardened bushing 32 is inserted. The parts are assembled so that these platforms 30 are turned inwards, the centres of the bushing being on the centre line of the chain.

In Figures 10 and 11 the parts are shown assembled with the platforms turned outwards. It is evident that some of them may be turned inwards and some outwards so as to provide any desired staggered arrangement. If, for example, all the platforms belonging to inner links are turned inwards and those belonging to outer links turned outwards an arrangement similar to that shown in Figure 5 is obtained. Again, alternate sideplates having the platforms 30 may be placed on the other side of the chain so as to provide staggered holes in two rows more widely spaced. Another variant consists in providing the sideplates on both sides of the outer links, or of the inner links, or both, with platforms 30 which are outwardly turned thereby providing two rows of non-staggered holes having a pitch equal to that of the chain or equal to one half that pitch, respectively. Other patterns of holes can be obtained, as will be evident, by turning some of the platforms 30 inwards.

It is evident that jigs according to this invention may be used for operation other than drilling, for example reaming, tapping, engraving and punching. In the case of engraving and punching the holes in the bushings may in some cases be non-circular.

I claim:

1. A flexible jig for use in drilling holes at equally spaced intervals on a curved surface, comprising a number of bushings and pivoted joints connecting said bushings together end to end.

2. A flexible jig according to claim 1 in which the joints comprise inner links and outer links jointed together by means of studs and bushing, and rollers mounted to rotate on the bushings and having grooves the profiles of which are circular arcs and the diameters of the rollers are such that the arcs of any two successive rollers are concentric.

3. A jig according to claim 1 in which the joints consist of outer links comprising sideplates connected together by studs, and blocks provided with transverse holes connecting together the studs of successive outer links.

4. A flexible jig for use in drilling holes at equally spaced intervals on a curved surface in the form of a standard transmission chain, in combination with apertured blocks inserted between the sideplates of the inner links.

5. A flexible jig for use in drilling holes at equally spaced intervals on a curved surface, comprising side plates connected by pivoted joints in the form of a transmission chain, certain sideplates having extensions at one side bent over at right angles to the plane of the chain to provide platforms having holes and hardened bushings inserted in said holes.

JAMES WEEDY.